A. J. ISLER.
Piston-Packings.

No. 147,134. Patented Feb. 3, 1874.

Witnesses:
G. Mathys
Solon C. Kemon

Inventor:
Andrew J. Isler
Per
Attorneys.

UNITED STATES PATENT OFFICE.

ANDREW J. ISLER, OF BROWNSVILLE, PENNSYLVANIA.

IMPROVEMENT IN PISTON-PACKINGS.

Specification forming part of Letters Patent No. 147,134, dated February 3, 1874; application filed January 5, 1874.

*To all whom it may concern:*

Be it known that I, ANDREW J. ISLER, of Brownsville, in the county of Fayette and State of Pennsylvania, have invented a new and Improved Piston-Packing; and I do hereby declare that the following is a full, clear, and exact description of the same, reference being had to the accompanying drawing forming a part of this specification, in which—

Figure 1:
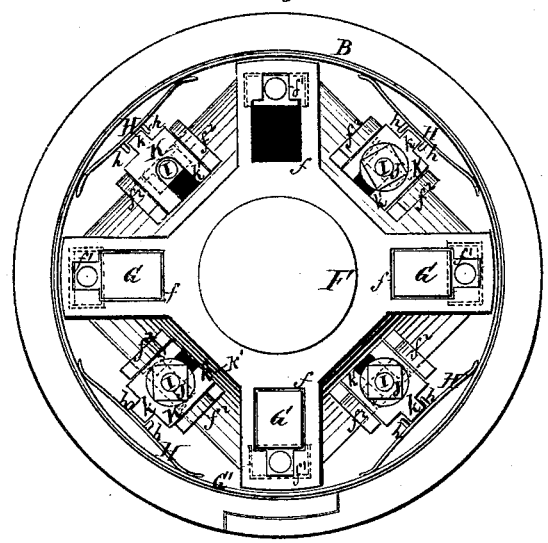
Figure 2:
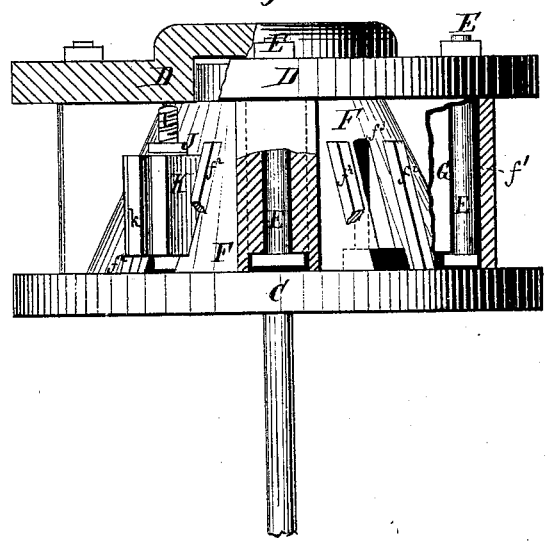

Figure 1 is a top view of the piston-head, the follower being removed. Fig. 2 is a side elevation, the packing-rings being removed.

The invention relates to means whereby wedges may be applied in a novel and useful manner to the spring packing of a piston, and to means whereby the screws that fasten the follower to the piston-head may be fastened by nuts on the outside, while the heads of the bolts are located on the inside of the piston-head.

In the drawing, B represents the usual packing-rings, held between the head C and follower D of the piston by the bolts E. The latter are inserted, with the head next the piston-head, through the large opening $f$ of the legs of the spider F, and then carried laterally into the smaller side opening $f^1$, which is enlarged at the end next the piston-head to confine the bolt-head. A wooden or other block, G, is then inserted loosely in aperture $f$, so as to prevent the lateral movement of the bolt. It is thus securely held in place, while it can be readily removed. G' is an inner packing-ring, held out against the packing-rings B at all parts of its circumference by means of the ordinary springs H, which are usually forced against the ring G' by a hammer-driven wedge, or one operated by an adjusting-screw actuated from the outside of follower.

To produce a more easy and convenient mode of applying the wedge, I tongue-and-groove the wedge K, at $k$ and $k'$, respectively, and cause it to slide between the guides $h\ h$ on spring H, and the guides $f^2\ f^2$ on the inclined hub of the spider. Between the inclined guides $f^2\ f^2$ I make the groove $f^3$, which, together with wedge-groove $k'$, receives the shank of bolt I, while the bolt-head passes into a recess in the spider next the piston-head, and is confined in an enlarged aperture.

By turning the nut J down on the screw-bolt I, the wedge is pressed with increasing force against the springs, which, in turn, expand the packing-rings.

Having thus described my invention, what I claim as new, and desire to secure by Letters Patent, is—

1. The combination, with headed screw-bolts E, of the blocks G and spider-legs, having apertures $f\ f^1$ formed therein, as and for the purpose described.

2. The combination, with headed screw-bolts I, springs H, having on back the guides $h\ h$, and the hub of the spider of the piston, having the inclined guides $f^2\ f^2$, of the wedge K, having tongue $k$, and groove $k'$, as and for the purpose specified.

ANDREW JACKSON ISLER.

Witnesses:
 JOHN HERBERTSON,
 I. W. PORTER.